(No Model.)
G. S. MOTT.
DUPLEX TELEGRAPH.
No. 262,459.                                  Patented Aug. 8, 1882.
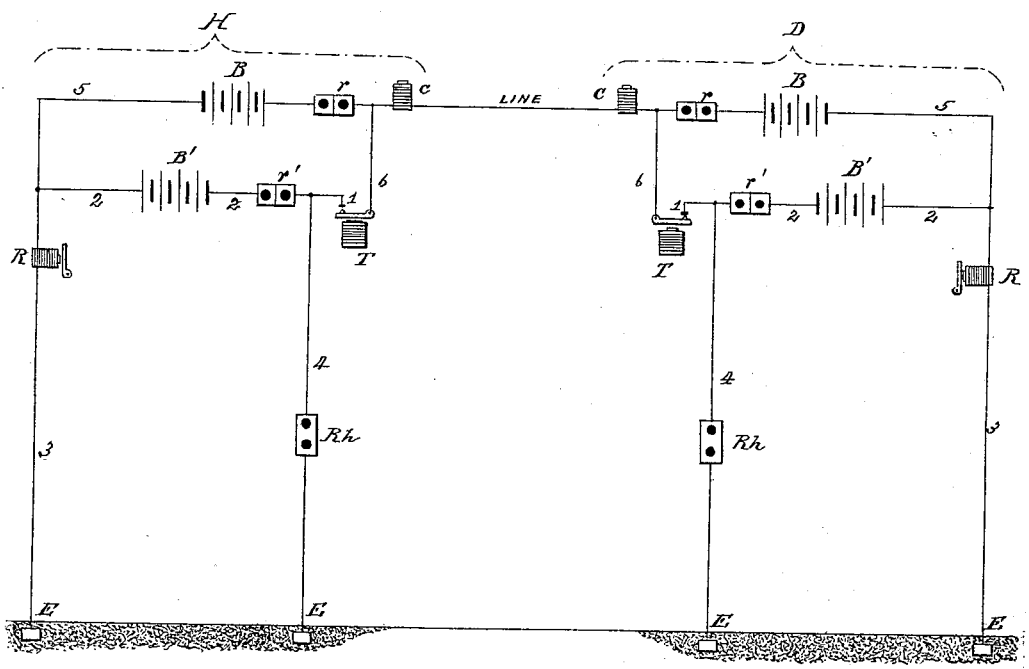
Witnesses
James F. Tobin
Harry Drury
Inventor
Garret S. Mott
by his Attorneys
Howson and Sons

UNITED STATES PATENT OFFICE.

GARRET S. MOTT, OF PHILADELPHIA, PENNSYLVANIA.

DUPLEX TELEGRAPH.

SPECIFICATION forming part of Letters Patent No. 262,459, dated August 8, 1882.

Application filed May 29, 1882. (No model.)

*To all whom it may concern:*

Be it known that I, GARRET S. MOTT, a citizen of the United States, and a resident of Philadelphia, Pennsylvania, have invented certain Improvements in Duplex-Telegraph Systems, of which the following is a specification.

My invention consists of an improved duplex-telegraph system, as more fully described hereinafter.

The view in the accompanying drawing is a diagram illustrating my invention, and as the arrangement of circuits at the home station H is the same as that at the distant station D a description of one will answer for both.

B are the main batteries, which have similar poles to the line, and each battery has a ground-connection through the conductor 5, coils of the relay R, and conductor 3. The armature-lever of the transmitter T is connected through the conductor 6 with the line in front of the battery B, and the back stop, 1, of this armature is connected by the conductor 4, containing resistance R $h$, to the ground, and by the conductor 2 with the conductor 5 3 between the battery B and the relay R. In the circuit 1, 2, and 3 is placed a battery, B', of about the same strength as the battery B, and having poles opposite to those of the battery B, and in the same circuit are resistances $r\ r'$, to prevent the short-circuiting of the batteries to such an extent as to cause their too rapid consumption, and to regulate the effect of both upon the line, for the battery B is never entirely withdrawn from the line. The resistance R $h$ is adjusted in respect to that of the line, the two batteries B and B', and the resistances $r\ r'$.

C is an electro-magnetic coil or coils, placed in the line-circuit in front of the battery B and connection of the conductor 6 with the line—that is, between the line and the station—for the purpose of counteracting the static discharge.

In the diagram I have shown the armature-lever of the transmitter T at the home station H as attracted by the electro-magnet for sending a signal, while the armature of the transmitter at the distant station D is in contact with its back stop, 1. When the armature is in the latter position the batteries B and B' are partly short-circuited through the conductors 6 1 2 5, part goes to line and keeps the latter charged to a certain extent, part goes to the ground through the relay R and wire 3; but, as the currents from the two batteries go to line and to the relay with opposite poles, they do not affect the home or the distant relay; but when the transmitter-armature is attracted so as to withdraw it from connection with the back stop, 1, the battery B is then thrown on the line alone and operates the distant relay, while the battery B' is thrown into local circuit 4 2 3. This does not affect the home relay, however, because, the resistance R $h$ being considerable, both batteries B and B' go to ground through the wire 3 and home relay with about the same strength, and the effect of one on the relay is neutralized by the other.

I claim as my invention—

1. A station for a duplex-telegraph system, consisting of a relay, transmitter, back stop, 1, and conductors 2, 5, and 6, having two batteries, B B', in circuit, with ground-conductors 3 and 4, one including said relay and the other a resistance in circuit, substantially as set forth.

2. The combination of transmitter, conductors 2, 5, and 6, forming, with the armature of the transmitter, a local circuit containing two batteries and resistances $r\ r'$, with ground-wires 3 and 4 and resistance R $h$ and relay, all substantially as described.

In testimony whereof I have signed my name to this specification in the presence of two subscribing witnesses.

GARRET S. MOTT.

Witnesses:
HARRY DRURY,
HUBERT HOWSON.